United States Patent [19]

Ramirez

[11] 4,071,447
[45] Jan. 31, 1978

[54] DEWATERING OF WASTEWATER TREATMENT WASTES

[75] Inventor: Ernest R. Ramirez, Lemont, Ill.

[73] Assignee: Swift & Company, Chicago, Ill.

[21] Appl. No.: 719,438

[22] Filed: Sept. 1, 1976

Related U.S. Application Data

[63] Continuation-in-part of Ser. No. 568,382, April 16, 1975, abandoned.

[51] Int. Cl.² .......................... C02C 3/00; B03D 1/00
[52] U.S. Cl. ...................................... 210/44; 210/194; 210/221 M; 210/221 P
[58] Field of Search ............... 210/10, 44, 54, 59, 210/194, 209, 221 M, 221 P

[56] References Cited

U.S. PATENT DOCUMENTS

| | | | |
|---|---|---|---|
| 3,183,186 | 5/1965 | Oster | 210/10 |
| 3,479,281 | 11/1960 | Kikindai et al. | 210/44 |
| 3,510,001 | 5/1970 | Baer et al. | 210/44 |
| 3,543,936 | 12/1970 | Abson et al. | 210/10 |
| 3,697,417 | 10/1972 | Teletzke et al. | 210/10 |
| 3,816,274 | 6/1974 | Anderson | 210/44 |
| 3,817,865 | 6/1974 | Austin | 210/44 |
| 3,822,204 | 7/1974 | Sako et al. | 210/44 |

*Primary Examiner*—Thomas G. Wyse
*Attorney, Agent, or Firm*—Edward T. McCabe; Charles E. Bouton; Jay C. Langston

[57] ABSTRACT

Wastewater treatment wastes, such as skimmings or sludges, are processed so as to reduce the water content by approximately two thirds and increase the impurities content thereof. The wastes are passed over a dense supply of very fine bubbles. These fine bubbles assist in floating impurities within the wastes to result in the formation of an upper stratum of gas, residual water and a concentrated impurities content and of a lower stratum that is primarily water, after which the upper and lower strata are separated.

20 Claims, 6 Drawing Figures

DEWATERING OF WASTEWATER TREATMENT WASTES

This is a continuation-in-part of U.S. Ser. No. 568,382, filed Apr. 16, 1975, now abandoned.

The present invention relates to an improved process and apparatus for dewatering wastewater treatment wastes by the action of very fine gas bubbles within a chimney column.

In the clarification of industrial and municipal wastewaters, it is customary to coagulate solid or liquid impurities or particulates by various means and then to separate the impurities or particulates from the purified wastewater by such means as flotation or sedimentation. This accomplishes a so-called primary treatment of the wastewater. In any such process, there are formed large quantities of wastewater treatment wastes, which are considered to be solid wastes and are identified as either skimmings or sludges. The term wastewater skimmings generally refers to that portion of treated wastewater which has been floated and skimmed from the surface of water subjected to a primary treatment. Such skimmings generally include agglomerated solid or liquid impurities or particulates, a substantial quantity of water, and a quantity of gas. The term wastewater sludges generally refers to that portion of primarily treated wastewater which has been precipitated from a wastewater and includes precipitated solid or liquid impurities or particulates, and a substantial quantity of water. Such skimmings or sludges may be characterized as activated sludge, packinghouse skimmings, meat processing skimmings, food processing skimmings, dairy and poultry skimmings, dehairing skimmings, laundry skimmings, and the like.

These wastes usually have a relatively low solid or liquid impurities content, on the order of 0.1 to 8 weight percent of the skimmings or sludges. Unless the wastes themselves have a marketable value, such as having a significant fats and oils content, they must be disposed of properly. Such disposal operations will be less expensive and more efficient if the volume of the wastes is reduced and if the water content of the wastes is reduced and consequently the weight percent of impurities therein is increased. These procedures can be referred to as effecting a dewatering of the wastes.

Processes such as sedimentation, centrifugation, chemical treatments, treatments utilizing various filtering means such as filter presses, vacuum filters, pressure filters, sand filters and membrane filters, and various combinations of such processes, have been known to produce a certain amount of wastes. These known processes tend to be relatively ineffective and often require substantial manual labor and large capital investment. The use of flotation techniques also have been disclosed as useful in dewatering operations in prior art such as Sako et al, U.S. Pat. No. 3,822,204 and Brink et al, U.S. Pat. No. 3,642,617.

It is therefore an object of the present invention to provide an improved process and apparatus for dewatering the wastes from wastewater treatments by the removal of as much as approximately ⅔ of the water content thereof.

Another object of this invention is an improved process and apparatus whereby wastewater treatment wastes are separated into a lower stratum of substantially clarified water and an upper stratum of gas, residual water, and which has a concentrated solid or liquid impurities content.

A further object of this invention is to provide an improved process and apparatus whereby the impurities content of wastewater treatment wastes is increased from about 2 to about 7 times.

The present invention is an improved process and apparatus for dewatering wastewater treatment wastes wherein said wastes are positioned within a chimney above and in contacting relationship with a supply of very fine bubbles, which bubbles effect an urging of the solid or liquid impurities within the wastes into an upper stratum of gas, residual water and a concentrated impurities content, while water within the wastes is downwardly displaced by said gas bubbles into a lower stratum of substantially clarified water, removing the upper stratum from the upper portion of the chimney, and removing the lower stratum from said chimney at a location below the bubble supply.

Additional objects, if not set forth specifically herein, will be readily apparent to those skilled in the art from the detailed description of the invention which follows and from the drawings in which.

Generally, the present process includes the passage of wastewater treatment wastes over a supply of tiny bubbles while confining the wastes and bubbles within a column to displace some of the water and thereby increase the solid or liquid impurities content of the wastes. The thus treated wastes are then permitted to rise within the confines of the column, whereupon they are separated from the displaced water.

More particularly, in the preferred process, the wastes enter the column in one or more downward streams that are deflected in an open cone-like manner. Preferably these deflected wastes are shortly thereafter contacted with a flocculant that is provided in one or more upward streams that are deflected in a complementary open cone-like manner. This complementary arrangement serves to spread the wastes which assists in separation of the particulate matter from the water and enhances the ability of the particulate matter to contact the rising bubbles and the deflected flocculant. In another embodiment, the wastes enter the column in a primarily horizontally oriented entrance zone located along the length of the column. In this embodiment, it is usually advantageous to have the wastes deflected somewhat upwardly as they enter the column from the horizontal zone. Flocculant can be supplied along a horizontal source below the horizontal zone.

The bubbles are supplied from a location below the points of entry of the wastes and of the flocculant. The bubbles then displace a significant amount of the water content of the wastes. It is believed that this dewatering process involves a direct interaction between the bubbles and the solid or liquid impurities of the wastes. The terms "solid and liquid impurities" and "impurities"

used herein refer to solids and non-aqueous liquids that occur within industrial and municipal wastewaters.

During this interaction, the finest of the bubbles pair off with and tend to become attached to the waste impurities to form composites of gas and impurities. The apparent density of these composites is less than 1, leading to the flotation of such composites within the water of the wastes. Continued supplying of these bubbles produces additional dense volumes of bubbles within the confines of the column. These bubbles then displace much of the water phase from around the floating composites to form a relatively thick upper stratum containing impurities, gas, and residual water. The apparent density of such upper stratum is lowered even further as the rising bubbles displace a volume of water from the upper stratum to a lower stratum which is primarily water that has been separated or released from the wastes. As the process continues, the apparent density of the upper stratum approaches a specific gravity value of about 0.6. The floating upper stratum is then removed for proper disposal or further processing, while the lower stratum, which includes roughly ⅔ of the initial water content of the wastes, is allowed to flow as a substantially clarified effluent. Preferably such flow is from below the bubble supply, but it can also be from immediately thereabove. The substantially clarified effluent preferably flows into a substantially horizontal exit zone that is external to said column and is in communication with the length of the column. Thereafter the effluent preferably is directed upwardly to a height approximate to the surface of the upper stratum.

When the bubbles are supplied electrolytically, the process may include the step of feeding a supply of an assisting electrolyte, such as a salt, into the skimmings or sludges prior to the passage thereof over the electrode grid. The assisting electrolyte significantly raises the conductivity of the wastes to thereby greatly increase the efficiency of the electrolytic process. The conductivity increase greatly assists in the formation of adequate amounts of tiny bubbles even at very low voltages, for example as low as 4 volts, to minimize power requirements. Preferably, the amperages range between about 10 to about 150 amps per square foot of electrode surface.

Such an assisting electrolyte can also serve to enhance or complete the coagulation and charge neutralization of solid particles within the wastes. When the assisting electrolyte is also a disinfecting agent, impurities such as fecal coliform can be simultaneously treated. For example, the use of sodium chloride as the assisting electrolyte in the present process when used to dewater tannery skimmings having fecal coliform counts on the order of several million per 100 cc reduced such counts virtually to 0.

When disinfecting or the like is not desired, the use of some other inexpensive salt as the assisting electrolyte can have advantages. It has been found that the use of a salt such as sodium sulfate will reduce corrosion problems generated by assisting electrolytes such as sodium chloride while also increasing the efficiency of bubble generation. A combined addition of, for example, sodium chloride and sodium sulfate will serve both to disinfect and to maintain a high degree of efficiency and can be the preferred assisting electrolyte in applications of the present process to certain types of wastes.

The quantity of assisting electrolyte, if added, will vary with the quality of the assisting electrolyte and with the type of wastes being treated. For example, the optimum concentration of sodium chloride for addition to certain packinghouse skimmings has been found to be on the order of 3,000 milligrams of salt per liter of wastes. Generally, concentration ranges that have been found to be beneficial are from 1,000 to 10,000 milligrams of assisting electrolyte per liter of wastes.

The flocculant that is added in accordance with the preferred process is primarily for the purpose of obtaining a lower stratum of superior clarity and can be omitted, if desired. The flocculant can be a polymer such as polyacrylamide that is added at concentrations within the range of about 10 to 50 milligrams per liter of wastes to assist in reducing suspended solids within the lower stratum, the eventual effluent. While it is intended that most flocculants would be suitable for use in this process, it has been determined that polyelectrolytes are especially suitable. Such include polyacrylic acrylamides, copolymers of from about 50 to about 90 weight percent acrylamides or methacrylamides, and from about 10 to about 50 weight percent acrylic or methacrylic acid or water soluble salts thereof. Polymers of this type are known in the art and are characterized by a weight average molecular weight of about 2 million and usually within a range of about 7 to 12 million as measured by light scattering techniques.

The present process can be proceeded with either in a batch or in a continuous manner. Effective batch dewatering is accomplished in from about 1 to 10 hours. When the process is carried out in a continuous manner, the dewatering flow rate will vary depending upon the content of the wastes being dewatered and the capacity of the particular apparatus being used. In a general sense, the flow rate of the skimmings is proportioned to the horizontal area of the dewatering column. Flow rates can vary from about 0.2 to about 2 gallons of skimmings per minute for each square foot of a horizontal cross-section through the column at a location near the supply of bubbles.

To achieve effective dewatering with the continuous process of this invention at flow rates of this magnitude, it is essential that adequate amounts of bubbles be supplied. Measured in terms of the volume of gas bubbles provided at the supply of bubbles positioned within the column such adequate amounts can range from about 0.2 to about 2 cubic feet of gas bubbles per hour per square foot of a horizontal cross-section through the column at the location of the supply of bubbles. Preferably, the volume will be on the order of one cubic foot per minute per square foot of area. These gas volume measurements are at approximately standard temperature and pressure.

In a variation of the basic process discussed herein the wastes can be subjected to a heating step prior to being passed over the electrode grid. Preferably, such heating, when accomplished, is carried out in lieu of the preferred step of feeding either or both of an assisting electrolyte and a flocculant, but same may also be proceeded with in addition thereto. While the heating step may be accomplished shortly prior to or after such feeding step, heating after feeding has the advantage of avoiding the possibility that the wastes would be lowered in temperature upon being contacted with an unheated quantity of the fed substance. The heating step will raise the temperature of the skimmings to between about 100° to 200° F. Protein bearing skimmings would generally be heated to at least about 135° F. to promote an accelerated coagulation thereof.

It is believed that such heating step increases the effectiveness of the bubble formation in that it apparently both lowers the surface tension and also increases the conductivity of the water within the wastes. These features promote the formation of large quantities of very small bubbles (as small as 20 to 80 microns in diameter) which are found to be especially suitable in forming the composites and in displacing water from the upper stratum to the lower stratum.

One other optional feature of this process will also lower the surface tension of the water of the wastes and is especially suitable for use when the bubble supply is provided by gas dispersion. Such is the step of feeding a surfactant into the wastes prior to the formation of the bubbles. The preferred surfactant is an anionic or non-ionic coco alkylalamide detergent and wetting agent. Others include ethoxylated nonyl phenol nonionic surfactants; stearate, oleate and laurate based soaps; and alkyl aryl sulfonate anionic detergents. The addition of very small quantities of surfactant, usually approximately 0.01 to 0.001 weight percent of the volume skimmings or sludges being dewatered will significantly lower the surface tension to values on the order of 25 to 60 dynes per square centimeter.

It has also been determined that lowering the surface tension, either by one or both of the heating steps or the surfactant feeding step, enhances the previously described displacement of water within the upper stratum by the fine bubbles, such displacement being downwardly into the lower stratum. Such lowered surface tension allows water to drain more rapidly from the upper layer to thereby promote the concentration of impurities within the upper stratum. Surface tension adjustment is also usually effected when dispersed bubbles are supplied, as discussed hereinafter.

In discussing the effectiveness of the present process, it is helpful to distinguish between those wastes which include metal hydroxides and those which do not. During the formation of wastes, metal salt coagulants such as ferric sulfate are often utilized, whereby metal hydroxides are incorporated into the wastes. Such metal hydroxides tend to exhibit a physical consistency in the nature of a gel, which leads to the skimmings or sludges having a relatively high water content and a relatively low solid or liquid impurities content and also a tendency to resist further dewatering.

Consequently, skimmings or sludges which contain metal hydroxides such as aluminum or ferric hydroxide are more difficult to dewater than are wastes that do not contain such hydroxides. For example, wastes without metal hydroxides can have an impurities content on the order of 15 weight percent and can be dewatered under the present process to an impurities content of about 30 percent. Skimmings that contain metal hydroxide tend to have impurities content of only about 4 weight percent. Still, under the present process, even such dewatering-resistant skimmings can be readily dewatered to an impurities content on the order of 17 weight percent.

The bubbles of the present process may be electrolytically generated from the water phase of the wastes as it passes over a plurality of electrodes, alternate ones of which serve as anodes while the remaining alternate electrodes serve as cathodes. After hours of use, various ions and other impurities begin to accumulate on the electrodes, especially those serving as cathodes. Accordingly, provision is usually made for periodically reversing the polarity of the electrodes to prevent excessive impurities from accumulating on the electrodes. Polarity reversal should be undertaken no less than once each week and no more than once every hour of on line use. Preferably, the polarity should be reversed about every 10 to 14 hours of use.

The gas bubbles for this process need not be generated electrolytically but can be supplied by other means, such as by dispersing gases through shearing water or by dissolving bubbles within water, provided such means can supply an adequate volume of gas bubbles as previously discussed herein, i.e., from about 0.2 to about 2 cubic feet of gas bubbles per hour per square foot of column horizontal cross-section.

When the gases are supplied through dispersion, these volumes can be maintained only if the surface tension of the water into which the gas is being dispersed is less than 60 dynes per square centimeter. At this surface tension, about 3 volume percent of the water can be dispersed with a gas such as air. If the surface tension is about 42 dynes per square centimeter, about 10 volume percent of gas can be dispersed. Should it be adjusted to around 30 dynes per square centimeter, then as much as 35 volume percent is possible. Both the volume percent and the size of the bubbles are controllable by adjusting the surface tension, usually with the surfactants previously described. The preferred volume percent ranges between 2 and 30, bubble sizes between 30 and 150 microns.

It is preferred that the water into which the gas is dispersed be recycled water that is removed from the wastes in the dewatering system. The dispersion itself is accomplished by mechanically creating high shear between the gas and the water after the gas is introduced into the water. The gas introduction is preferably uniform and is usually assisted by a moderate pressure of about 5 to 20 pounds per square inch. Often, it is necessary to add between 5 to 200 ppm surfactant to keep the surface tension between 25 and 60 dynes per square centimeter. Preferably, the dispersion water is maintained at a surface tension of approximately 37 dynes per square centimeter, with the dispersed gas making up roughly 10 percent of the recycle flow through. When gas is introduced by dissolving techniques, the gas introduction usually must be accompanied by a greater pressure, on the order of 60 pounds per square inch.

Figure 1:
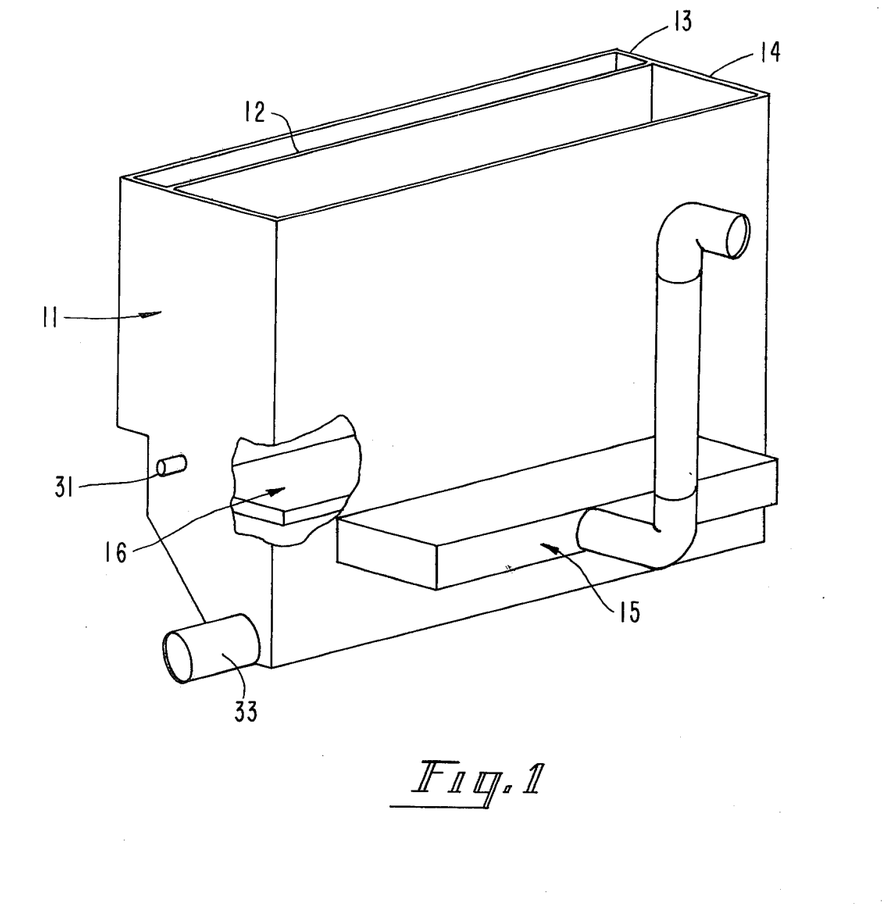
FIG. 1 is a perspective view of an apparatus of the present invention.

The apparatus that is shown in perspective in FIG. 1 includes a tank, generally indicated by reference numeral 11. A vertically oriented divider 12 separates the upper portion of tank 11 into an inlet hopper 13 and a chimney 14. An effluent efflux means, generally indicated by reference numeral 15, is located near the bottom of said chimney 14. A bubble supply means, generally indicated by reference numeral 16, is positioned toward the bottom of said chimney 14 but preferably above said efflux means 15.

Figure 2:
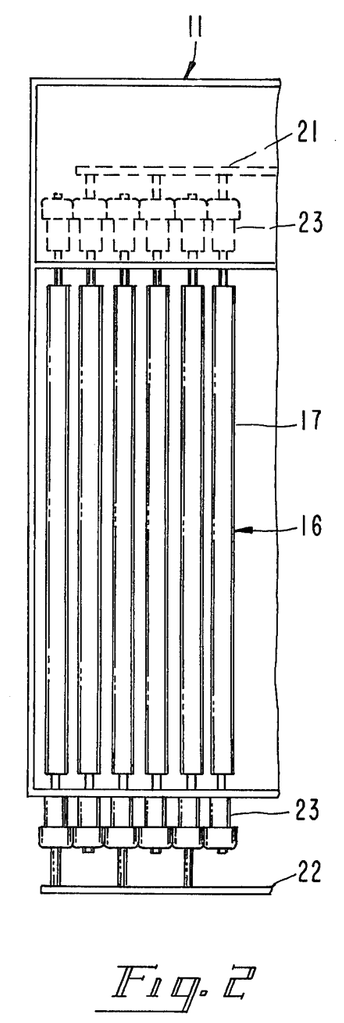
FIG. 2 is a detail view of a portion of an embodiment of the apparatus.

FIG. 2 shows a bubble supply means 16 that is an electrode grid including a plurality of electrodes 17. While the electrodes 17 within an electrode grid may be of varying quantities, shapes, sizes, spacings and construction materials, the following exemplary details are presented as being acceptable for practicing this invention. A particular electrode grid can contain about 150 electrodes of circular cross-section, having a diameter of $\frac{3}{4}$ inch. The electrodes are mounted parallel to each other in approximately the same horizontal plane, the spacing between the surfaces of adjacent electrodes being about $\frac{3}{8}$ inch. Electrode materials that can be used include platinized titanium and platinized niobium. Electrodes of ferrosilicon alloys, for example, Duriron, have been found to be very suitable and also especialy durable.

Each alternate electrode 17 is in electrical contact with one or two bus bars 21, 22, one bus bar 21 being in contact with one terminal of a D.C. power source, the other bus bar 22 being in contact of the other terminal of such power source. Accordingly, alternate electrodes serve as anode and cathode, respectively, with adjacent electrodes being electrically insulated from each other by insulation means 23 at the terminal ends of each electrode 17 so as to prevent short circuiting therebetween.

It is preferred that an injector 31 open into the tank 11. As can be best seen in FIG. 3, injector 31 can be an elongated conduit which extends the length of the tank 11 and includes a plurality of openings 32 along its length so as to provide for a relatively uniform distribution of injected substances throughout the length of tank 11. Such injected substances can include, for example, the assisting electrolyte, the flocculant, or the surfactant, as previously discussed herein.

Figure 3:
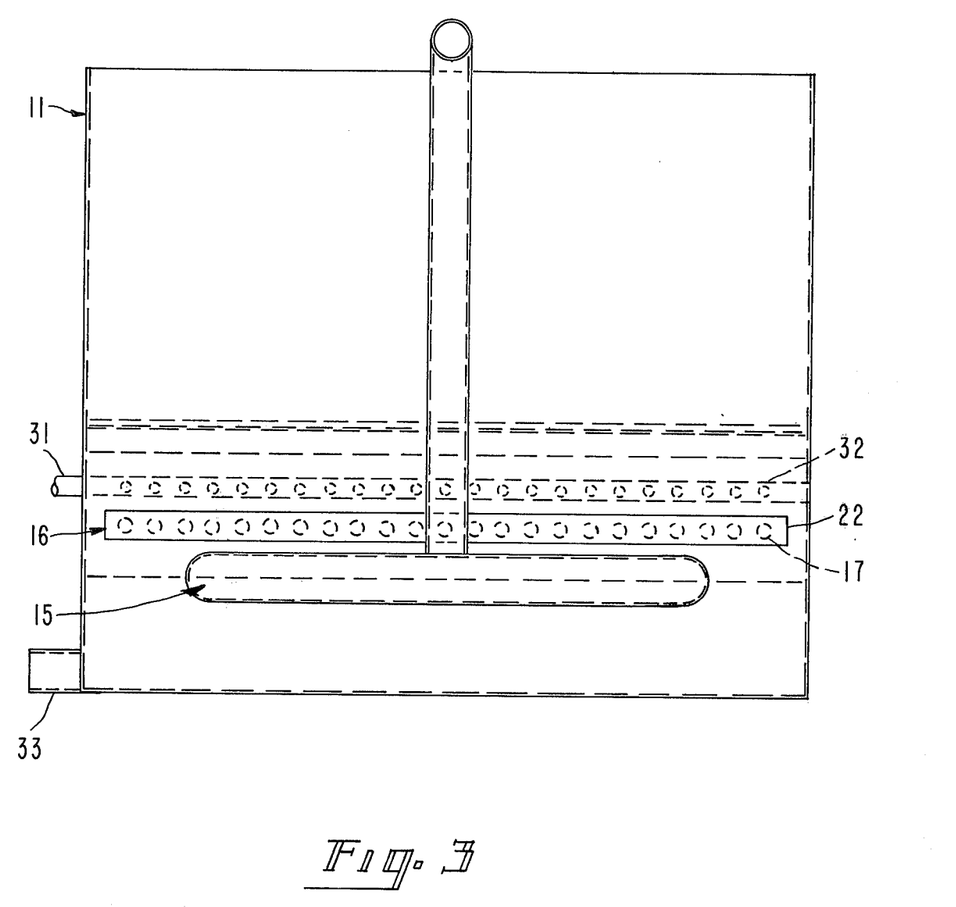
FIG. 3 is a front elevation view of the apparatus of FIG. 2.

Also provided is a relatively large purging means 33 for facilitating the removal of relatively large and dense impurities and for the general cleaning of the tank 11. The purging means 33 is preferably located in a bottommost location of the chimney 14.

Figure 4:
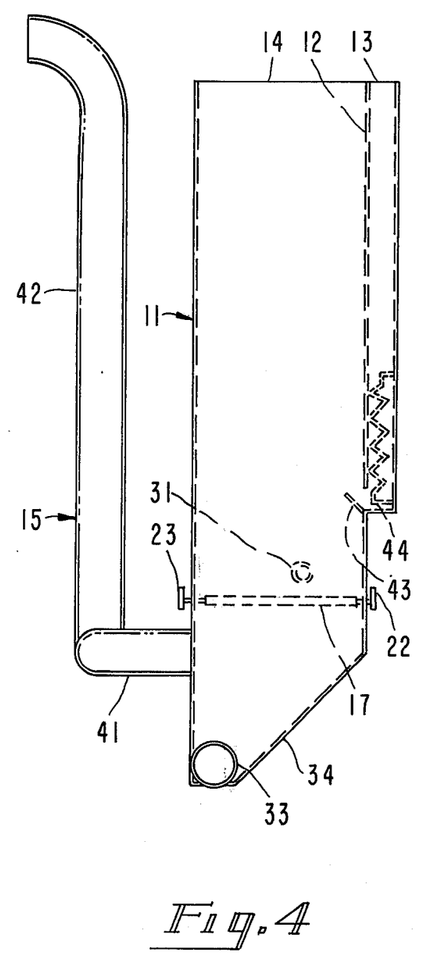
FIG. 4 is a side elevation view of the apparatus shown in FIG. 3.

From FIG. 4 it can be seen that such lowermost portion of the chimney 14 preferably has a tapered end 34 which serves to direct large impurities within the waters toward the purging means 33 and also lessens the chance of the large impurities being passed into the efflux means 15 which is exterior to said chimney and in communication therewith along the length thereof. Preferably, efflux means 15 includes an enclosed, relatively flat, and a generally horizontally elongate chamber 41 which opens into a generally vertically oriented efflux conduit 42.

The inlet hopper 13 opens into chimney 14. In the preferred construction of this embodiment, a baffle 43 restricts this opening so as to impart a vertical as well as a horizontal directional component to fluids passing from the hopper 13 into the chimney 14. Baffle 43 can be upwardly inclined and is positioned substantially along the length of the tank 11 at the line of attachment of the bottom of said inlet hopper 13 with said chimney 14, said line of attachment being below the divider 12. An optional structural feature is the placing of a heating means 44 within said tank 11, preferably within inlet hopper 13, so that the waters may be heated prior to being contacted with gas bubbles rising from said supply means 16.

The heating means 44 may take any form that is adequate to raise the temperature of the wastes to between about 100° to 200° F., such as a steam pipe or a resistance heater. Alternatively, it is within the scope of this invention to have the wastes heated prior to their passage into hopper 13 by means of a preheating device (not shown).

Figure 5:
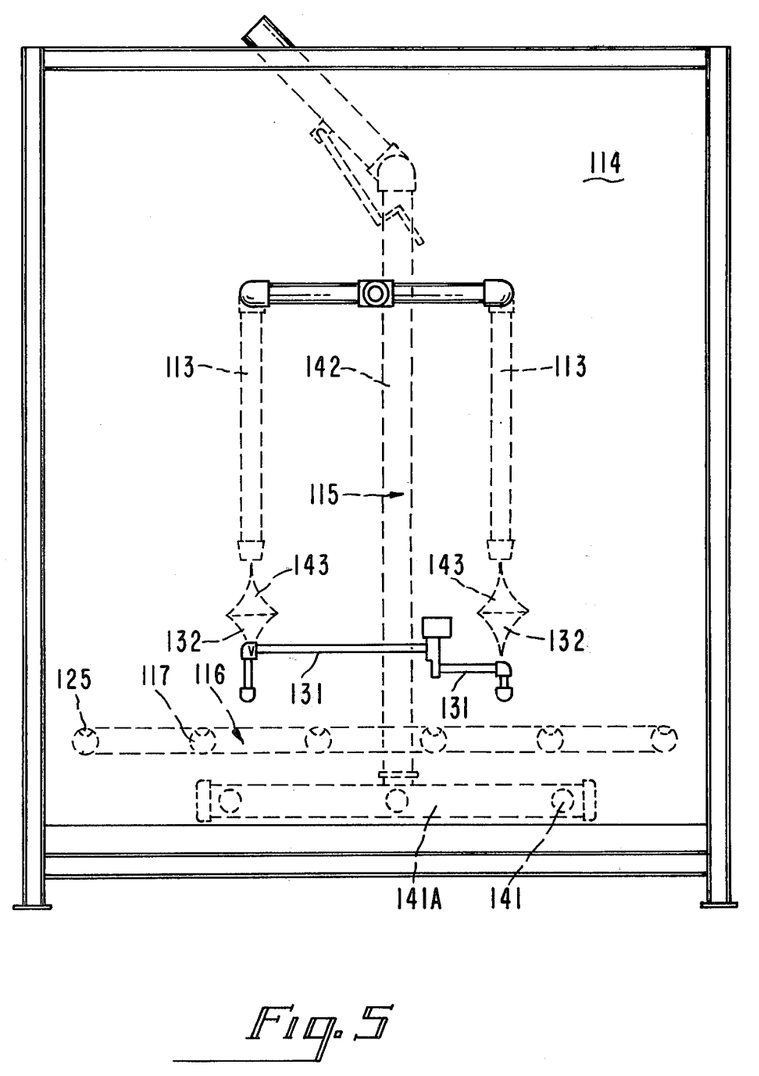
FIG. 5 is a front elevation view of the preferred apparatus.
Figure 6:
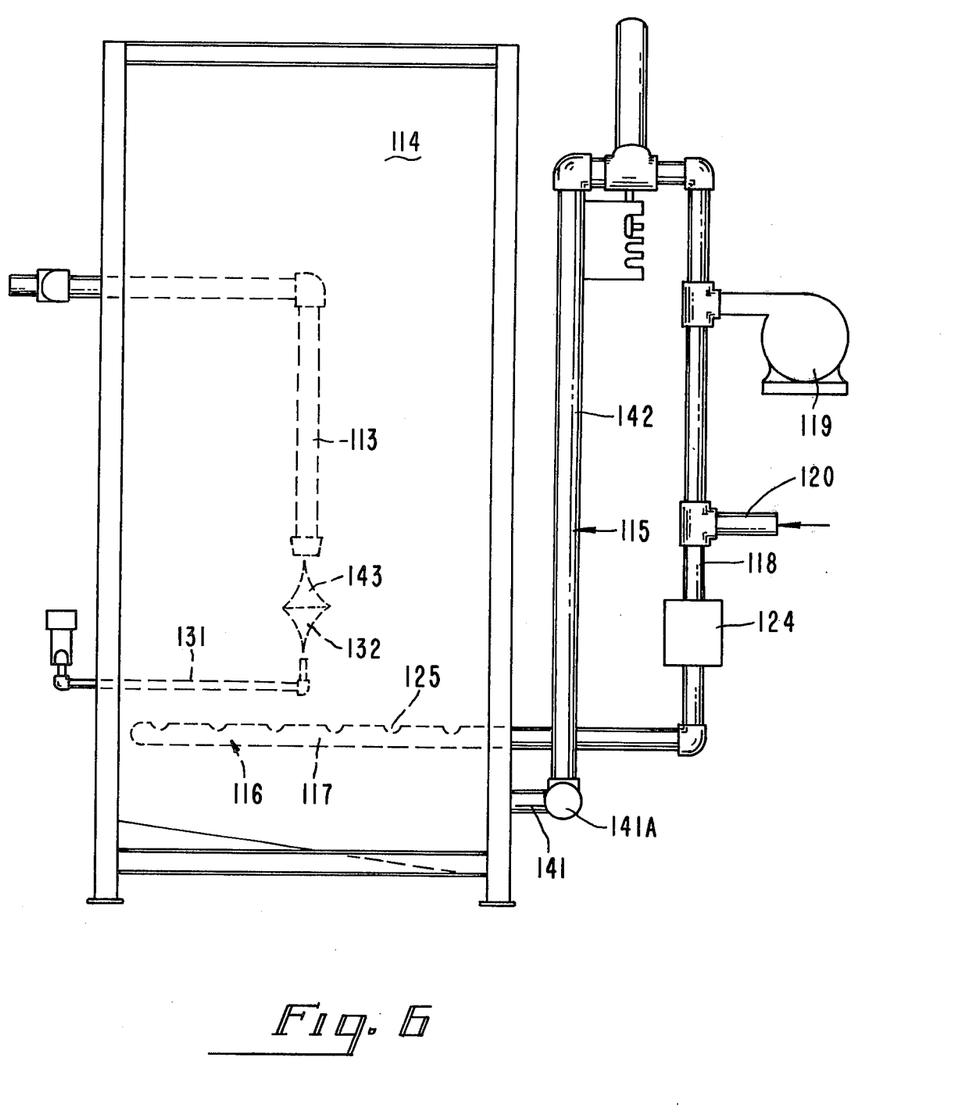
FIG. 6 is a side elevation view of the apparatus shown in FIG. 5.

The preferred apparatus of FIGS. 5 and 6 replaces the hopper 13 and baffle 43 slotted entrance of FIGS. 2-4 with one or more combinations of a pipe 113 and a generally cone-shaped baffle 143. Also, ejector 31 with openings 32 is replaced with one or more combinations of a pipe 131 and a generally cone-shaped baffle 132. The broadest ends of baffles 143 and 132 abut each other to effect the spreading and contacting functions described herein. These functions are enhanced when baffles 143, 132 have the shape depicted in FIGS. 5 and 6, a modified cone shape.

The modification is that the cone-shaped baffles have concave surface areas. The degree of concaving should be moderate in order to avoid unnecessary impacts of the wastewater treatment wastes upon baffle 143. This is especially important when the wastes treated are skimmings, which include beneficial conglomerates of particulate matter that will break up when impacted and would have to be reformed by the present apparatus to accomplish the desired dewatering. More particularly, the moderate concaving can be quantified by the following preferred ranges of the relative dimensions of baffles 143, 132. The preferred ratio between the height of each modified cone to the largest cross sectional diameter (at the circumference where baffles 143, 132, abut each other) is about 1 to 1. The preferred ratio between this height to the radius of curvature of the concave surface is about 1 to 2.

FIGS. 5 and 6 also illustrate an alternate structure of the efflux means, generally referred to by reference numeral 115. Means 115 includes a horizontal elongated chamber comprising a plurality of horizontal conduits 141 joined by a horizontal trough 141A which opens into the generally vertically oriented efflux conduit 142.

The preferred recycle means for supplying gas bubbles into chimney 114 is shown in FIG. 6. Conduit 142 opens into a recycle pipe 118. An injector 119 communicates with recycle pipe 118 for the addition of a surface tension adjusting agent, when needed. Downstream of injector 119 is a gas source 120 which is dispersed or dissolved into the recycled water supply by a mechanical gas injector 124. Recycle pipe 118 then communicates with the bubble supply means, generally identified by reference numeral 116, which includes one or more distributors 117 having orifices 125.

Mechanical gas injector 124 may be a blender or mixer having moving blades. It may be a static mixer having no moving parts, but having stationary vanes within a conduit through which fluids are passed. Gas injector 124 may also be a means for dissolving gas within water.

In the preferred operation of the apparatus of this invention, wastewater treatment wastes are introduced into chimney 14, 114 through hopper 13 or pipe 113, such wastes being deflected by baffle 43, 143. As discussed previously herein, the gas bubbles from bubble supply means 16, 116 float portions of the wastes and thereby displace some residual water within such floated wastes. This process can be aided by the addition of one or more of the assisting electrolytes, the flocculant, and/or the surfactant through injector 31, 131. The floated impurities rise up chimney 14, 114 during which time some additional residual water is downwardly displaced by the rising gas bubbles. The floated dewatered wastes form the upper stratum which is removed from the top of chimney 14, 114, either manually or by a skimmer or similar mechanical means (not shown). The downwardly displaced water, which includes as much as roughly ⅔ the initial water content of the wastes, leaves chimney 14, 114 by passing through chamber 41 or 141 and 141A and efflux conduit 41, 142. Preferably, conduit 42, 142 is of a height roughly the same as the height of the upper portion of the chimney 14, 114 such that the displaced lower stratum (or substantially clarified effluent) will pass through at a relatively uniform rate to thereby lessen the chance that the movement of the lower stratum through bubble supply means 16, 116 will carry with it any significant amounts of the upper stratum. The general configuration of chamber 41 or 141 and 141A also enhances this feature of the apparatus.

The following examples are set forth as illustrative embodiments of the invention and are not to be taken in any manner as limiting the scope of the invention which is defined by the appended claims.

EXAMPLE I

Packinghouse skimmings that had been electrofloated while employing 230 ppm of ferric sulfate in the wastewater had an impurities content of about 4.5 weight percent. Five hundred gallons of such skimmings were placed in an apparatus such as shown in FIGS. 2-4 that has a basin that is 2 feet wide, 5 feet long, and 7 feet high for a batch treatment of two hours duration. A polyacrylamide was added and a quantity of electrolytically produced gas bubbles were supplied by a grid containing 50 insoluble electrodes having a current carrying capacity of 800 amperes. The impurities content of the upper stratum was found to be 19.5 weight percent. The effluent of this example contained the following impurities: COD, 1200 ppm; suspended solids, 250 ppm; and fats, oils and greases, 80 ppm. These values represent an average of many composite effluent samples. It was also observed that when the polyacrylamide was omitted, the effluent contained roughly four times the amount of impurities reported above.

EXAMPLE II

Electrofloated packinghouse skimmings produced utilizing a coagulant of 250 ppm ferric sulfate and having an impurities content of from about 4 to about 6 weight percent were passed through an apparatus in accordance with the present invention which generated a current of 300 amps. The process was accomplished in a batch of 400 gallons for about two hours. An anionic polyacrylamide polymer flocculant was added in quantities of 20 milligrams per liter of skimmings. The impurities content of the effluent was found to be 19.5 weight percent.

EXAMPLE III

Skimmings similar to those treated in Example II were processed continuously at a flow rate of 8 gallons per minute through an apparatus generating 500 amps at the electrode grid, with 20 milligrams per liter of the anionic polyacrylamide polymer flocculant being added. The impurities content of the effluent or dewatered skimmings were analyzed at 16.5 weight percent.

EXAMPLE IV

Electrofloated tannery wastewater skimmings which had been prepared with 500 ppm of ferric sulfate and which contained 4 to 5 weight percent impurities were processed in a batch of 400 gallons through an apparatus having an electrode grid generating 600 amps. Again, 20 milligrams per liter of polymer flocculant was added, the effluent analyzing at 14.2 weight percent impurities.

EXAMPLE V

Packinghouse wastewater treatment skimmings that had been prepared by air flotation and to which no coagulant had been added were processed through a batch cycle of a two-hour length. These skimmings initially analyzed at an impurities content of 15.5 weight percent. The apparatus was of a laboratory scale, the electrode grid generating 6 amps. No flocculant was added. The impurities content of the dewatered skimmings was found to be 29 weight percent.

EXAMPLE VI

An activated sludge from a municipal wastewater treatment operation was treated as in Example V. The sludge had an initial impurities content of 0.5 weight percent. After treatment in accordance with the present invention, the sludge had a dewatered impurities content of 3.5 weight percent.

EXAMPLE VII

Skimmings from the wastewater of a slaughterhouse, containing 10 weight percent impurities were poured into a graduated cylinder up to the 100 cc mark. Since these skimmings were determined to have poor conductivity, 0.1 weight percent of sodium sulfate was then added. An anode and cathode surface each of 0.7 square inch platinized titanium were inserted into the cylinder and 12 volts were employed, drawing a current of 400 milliamperes. This operation was continued for about 4 hours to form an upper stratum which had an observable impurities content and a lower stratum of apparently clear water. The clear water was observed to have a volume of roughly 70 cc, while the upper stratum also had a volume of about 70 cc. The upper stratum was found to contain about 45 weight percent impurities.

EXAMPLE VIII

A tannery wastewater which had been treated with ferric sulfate, lime and a polyelectrolyte produced wastewater skimmings having an impurities content of 4.5 weight percent. Such skimmings were heated to 160° F. and placed into a graduated cylinder up to the 100 cc mark. Platinized titanium anode and cathode having a surface area of approximately one half square inch were inserted into the cylinder and a current of 0.7 amperes was generated by a direct current supply of ten volts. After one hour and ten minutes, two strata were clearly visible. The upper stratum contained solid or liquid impurities, while the lower stratum contained substantially purified water. Each stratum had a volume of approximately 60 cc. The upper stratum was analyzed as containing approximately 12.5 weight percent impurities.

EXAMPLE IX

Slaughterhouse wastewater skimmings containing roughly 10 weight percent impurities and having a coliform count in the range of 1800 were combined with approximately 0.2 weight percent sodium chloride and were heated to approximately 150° F., after which they were poured into a graduated cylinder to the 100 cc mark. Platinized titanium anodes and cathodes spaced 0.15 inches apart, each having a surface area of 0.75 square inch were inserted therein, after which a current of 0.6 amperes was drawn by a voltage supply of 10½ volts. The treatment was continued for one hour and 30 minutes to form a substantially clarified lower stratum of water of about 50 cc and an upper stratum of dewatered skimmings of about 60 cc. The upper stratum was found to have an impurities content of about 30 weight percent, while the coliform count thereof was analyzed as zero.

EXAMPLE X

In this Example, one gallon of skimmings obtained from a packinghouse wastewater where primary wastewater treatment was carried out were dewatered. In this particular primary wastewater treatment, ferric sulfate had been used as a metal coagulant, and the percent solids or impurities in the skimmings was measured to be 5.6 weight percent. The apparatus utilized contained the structural features of the embodiment of FIGS. 5 and 6. Ordinary tap water was used to initiate the recycle process, the level of the tap water being such that it reaches the height of the bubble supply means. The surface tension of the tap water was lowered by the addition of a coco alkyloamide surfactant to a value of 37 dynes per square centimeter. At this point, a pump serving as the gas injector was put in operation to introduce air into the recycle system such that the flow of microbubbles and water through the pump was fixed at ½ gallon per minute. The flow of skimmings added was at a rate of 500 cc per minute and a polyacrylamide polymer flocculant was added at a rate of 20 ppm based on the skimmings flow. After operating the system for 15 minutes, a clear-cut separation of dewatered skimmings and water-enriched phase was obtained. The solids, or impurities, content of the dewatered skimmings was then found to be 23 weight percent.

Obviously, many modifications and variations of the invention as hereinbefore set forth may be made without departing from the spirit and scope thereof, and only such limitations should be imposed as are indicated in the appended claims.

I claim:

1. A process for dewatering wastewater treatment wastes such as skimmings or sludges, comprising: supplying wastewater treatment wastes of water and buoyant or precipitated impurities that had been previously coagulated during a primary treatment of the wastewater; entering said wastewater treatment wastes into a lower portion of a vertical column, said entering step being downwardly through a vertical zone; spreading said wastes at the lowermost portion of said vertical zone; passing a dense supply of small gas bubbles from a source lower than said lowermost portion of the vertical zone upwardly through said spread wastes; upwardly feeding a polymer flocculant at a location lower than said lowermost portion of the vertical zone and above the source of bubbles; permitting said spread wastes to contact said gas bubbles and floc to thereby form buoyant composites with the previously coagulated impurities within said wastes, confining said composites within said column, said confining step enhancing vertical movement of water and composites while limiting their horizontal movement; dewatering said wastes by permitting said dense supply of small gas bubbles to continue to rise within the vertical column and thereby downwardly displace all but a residual amount of water from said wastes to form an upper stratum of buoyant composites in wastes that have an impurities content significantly greater than that of said supplied wastes and a lower stratum of substantially clarified water; and separating said upper stratum and said lower stratum.

2. The process of claim 1, wherein said upper stratum has an impurities content of from about 2 to about 7 times greater than said supplied wastewater treatment wastes.

3. The process of claim 1, further comprising the step of heating said supplied wastes to about 100 to 200° F. prior to passing same over said bubbles.

4. The process of claim 1, wherein said flocculant is added in quantities within the range of about 10 to about 50 milligrams per liter of wastes.

5. The process of claim 1, further comprising the step of feeding a surfactant into said wastes above the supply of bubbles and prior to passing same over said bubbles, said surfactant being added at a concentration of about 0.01 to 0.001 weight percent of the wastes, thereby increasing the density of said bubble supply and increasing the efficiency of said downward displacement of water from the upper stratum.

6. The process of claim 1, wherein said entering step passes said wastes along the length of the column.

7. The process of claim 1, wherein said entering step includes passing said wastes in a downward stream and said spreading step deflects the stream in an open cone-like manner.

8. The process of claim 1, wherein said separating step includes effluxing said lower stratum from a location that is initially below said dense supply of bubbles to form an effluent stream having a maximum height which is at least as high as said upper stratum, and removing said upper stratum from the upper surface thereof.

9. The process of claim 8, wherein said lower stratum effluxing step further includes effluxing the lower stratum along substantially the entire length of the column in a substantially horizontal exit zone external to said column.

10. The process of claim 1, wherein said dense supply of gas bubbles are provided at a rate of about 0.2 to about 2 cubic feet of bubbles per hour per square foot of a horizontal cross-section through said column at a location approximate to that of said bubble supply.

11. The process of claim 1, further comprising the step of producing said dense supply of small gas bubbles from the water content of said wastes, said bubbles being produced by electrolysis, said electrolysis including applying direct current to a plurality of electrodes alternate ones of which serve as cathodes with the remaining alternate electrodes serving as anodes, and periodically reversing the polarity of said electrodes.

12. The process of claim 1, further comprising supplying said gas bubbles by recycling a portion of said lower stratum, including maintaining the surface tension of the recycled portion between about 25 to 60 dynes per square centimeter, then mechanically dispersing a gas therein, and directing the recycled portion of lower stratum with dispersed gas to provide said dense supply of bubbles.

13. The process of claim 1, further comprising supplying said gas bubbles by recycling a portion of said lower stratum, including dissolving a pressurized gas into said recycled portion and directing the recycled portion having gas dissolved therein to provide said dense supply of bubbles.

14. An apparatus for dewatering primary wastewater treatment wastes such as skimmings or sludges, comprising: a vertical chimney; a vertical inlet means opening into said chimney for introducing primary wastewater treatment wastes into the lower portion of the chimney; bubble supply means within said chimney and below said vertical inlet means; an injector located below said vertical inlet means and above said bubble supply means; a deflecting means communicating with said vertical inlet means for spreading said wastes into extensive contacting relationship with bubbles from said bubble supply means and with polymer flocculant supplied through said injector; an efflux means that is in communication with a vertical side of said chimney at a location below said bubble supply means, the horizontal distance between said vertical inlet means and said efflux means being less than the height of the vertical chimney; and said efflux means has a maximum height at least as high as the height of the wastes in the chimney.

15. The apparatus of claim 14, wherein said efflux means is external to said chimney and includes a horizontally elongate chamber and a vertical efflux conduit communicating with said chamber and terminating at a height approximately the same as the height of said chimney.

16. The apparatus of claim 14, wherein said vertical inlet means includes a downwardly opening pipe and a generally cone-shaped baffle immediately therebelow, and said injector includes an upwardly opening pipe and a generally cone-shaped baffle immediately therebelow, said baffles being in complementary, abutting relationship at their broadest ends.

17. The apparatus of claim 14, further including a heating means located upstream of said bubble supply means.

18. The apparatus of claim 14, wherein said bubble supply means is a grid of electrodes, alternate ones of which serve as cathodes and alternate others of which serve as anodes.

19. The apparatus of claim 14, wherein said bubble supply means is a gas dispersion or dissolving means.

20. The apparatus of claim 19, wherein said bubble supply means includes a recycle pipe in communication with said efflux means, a gas injector along said recycle pipe, and a distributor opening into the chimney below the wastes introducing means.

* * * * *

UNITED STATES PATENT OFFICE
CERTIFICATE OF CORRECTION

Patent No. 4,071,447      Dated January 31, 1978

Inventor(s) Ernest R. Ramirez

It is certified that error appears in the above-identified patent and that said Letters Patent are hereby corrected as shown below:

Column 1, line 53, after "of" insert --dewatering of--;

Column 3, line 15, after "rising" insert --gas--;

Column 7, line 1, cancel "especialy" and substitute --especially-- therefor; line 31, cancel "waters" and substitute --wastes-- therefor;

Column 8, line 63, cancel "41" and substitute --42-- therefor.

*Signed and Sealed this*

*Eleventh* Day of *July 1978*

[SEAL]

Attest:

RUTH C. MASON
*Attesting Officer*

DONALD W. BANNER
*Commissioner of Patents and Trademarks*